(12) United States Patent
Hood, III et al.

(10) Patent No.: US 9,396,365 B2
(45) Date of Patent: Jul. 19, 2016

(54) SYSTEM AND METHOD FOR PROVIDING USER-ACCESSIBLE CARD SLOT

(75) Inventors: Charles D. Hood, III, Cedar Park, TX (US); David May, Cary, IL (US)

(73) Assignee: Dell Products L.P., Round Rock, TX (US)

( * ) Notice: Subject to any disclaimer, the term of this patent is extended or adjusted under 35 U.S.C. 154(b) by 1740 days.

(21) Appl. No.: 12/425,840

(22) Filed: Apr. 17, 2009

(65) Prior Publication Data

US 2010/0264221 A1 Oct. 21, 2010

(51) Int. Cl.
*G06K 7/00* (2006.01)

(52) U.S. Cl.
CPC .................... *G06K 7/0021* (2013.01)

(58) Field of Classification Search
USPC .................. 235/486; 439/159, 152
See application file for complete search history.

(56) References Cited

U.S. PATENT DOCUMENTS

| | | | | |
|---|---|---|---|---|
| 5,051,101 A * | 9/1991 | Komatsu | ................ | G06K 13/08 439/159 |
| 5,196,687 A * | 3/1993 | Sugino | ................. | G06K 7/0021 235/441 |
| 7,766,678 B1 * | 8/2010 | Abe | ..................... | H05K 5/0295 439/159 |
| 2008/0122796 A1 | 5/2008 | Jobs et al. | ..................... | 345/173 |

\* cited by examiner

*Primary Examiner* — Michael G Lee
*Assistant Examiner* — Tabitha Chedekel
(74) *Attorney, Agent, or Firm* — Baker Botts L.L.P.

(57) ABSTRACT

Systems and methods for reducing problems and disadvantages associated with providing a user-accessible card slot are provided. A removable card carrier a configured to mechanically interface an information handling system may include a body and a cover. The body may be adapted to hold a card. The cover may be movably coupled to the body such that exterior surfaces of the cover and the information handling system are substantially flush with each other when card carrier is disposed in the information handling system.

20 Claims, 5 Drawing Sheets

000
SYSTEM AND METHOD FOR PROVIDING USER-ACCESSIBLE CARD SLOT

TECHNICAL FIELD

The present disclosure relates in general to improving the appearance of an information handling system or other item of equipment, and more particularly to providing a user-accessible card slot.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have become more commonplace, consumers are influenced by numerous factors in making purchases of information handling systems. While information handling system performance and capacity (e.g., processor speed, memory, non-volatile storage, peripherals, etc.) are often factors influencing consumer choices, consumers are increasingly factoring in aesthetics of information handling systems into their choices. For example, consumers often prefer information handling systems that have a more sleek or "clean" aesthetic design. To respond to such consumer demand, it is desirable to produce information handling systems that do not include many fasteners (e.g., screws, bolts, etc.), slots, or openings substantially visible from the outside of the information handling system. However, such aesthetic designs do not easily lend themselves to use of traditional approaches.

For example, traditional approaches to providing user-accessible card interfaces (e.g., interfaces for Subscriber Identity Module cards or "SIM cards") while maintaining desirable aesthetics, particularly in portable computers and other mobile devices, have numerous problems and disadvantages. According to one traditional approach, a user may remove a cover or panel from a mobile device (typically from the back surface of the mobile device) in order to expose the card interface. However, such an approach may not be aesthetically pleasing, as it typically requires a removable cover or panel that has an area equal to or larger to the area formed by the length and width of the card, and such panel and/or the means for removing it may be aesthetically unpleasing.

To reduce the portion of surface area of a device required to provide card interface access, another approach involves use of a carrier for a card, such that the card may be placed in the carrier, positioned substantially parallel to a plane defined by the length and width of the device and slid in into a side of the device nonparallel to the plane, thus requiring an opening slightly larger than the area created by the width and thickness of the card. The carrier may include or be attached to a cover, such that when the carrier is engaged with the device, the cover substantially aligns with the surface of the side of the device into which the tray was placed, thus creating a smooth or sleek look on the outside of the device. However, a disadvantage of this approach is that it may require strict alignment of the card connector internal to the device and the exterior surfaces of the device, such that the card may rest properly in the connector and the cover may rest flush with the exterior surface. Such requirement of strict alignment may require manufacturing processes with very low tolerances, which may increase manufacturing complexity and cost. If such strict alignment is not used, mechanical misalignment stress between the connector and the card carrier may be induced, which may potentially lead to damage of the card carrier or connector. In addition, if such strict alignment is not used, electrical contacts of the card and electrical contacts of the connector may not align properly while the cover rests flush with the exterior surface, potentially leading to inoperability.

SUMMARY

In accordance with the teachings of the present disclosure, the disadvantages and problems associated with aesthetically providing a user-accessible card slot have been substantially reduced or eliminated.

In accordance with an embodiment of the present disclosure, a removable card carrier a configured to mechanically interface an information handling system may include a body and a cover. The body may be adapted to hold a card. The cover may be movably coupled to the body such that exterior surfaces of the cover and the information handling system are substantially flush with each other when card carrier is disposed in the information handling system.

In accordance with another embodiment of the present disclosure, an information handling system may include a card interface assembly and a removable card carrier. The card interface assembly may be configured to receive a card. The removable card carrier may be configured to mechanically interface the card with the card interface assembly. The removable card carrier may include a body and a cover. The body adapted to hold the card. The cover may be movably coupled to the body such that exterior surfaces of the cover and the information handling system are substantially flush with each other when card carrier is disposed in the card interface assembly.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1A-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Figure 1A:
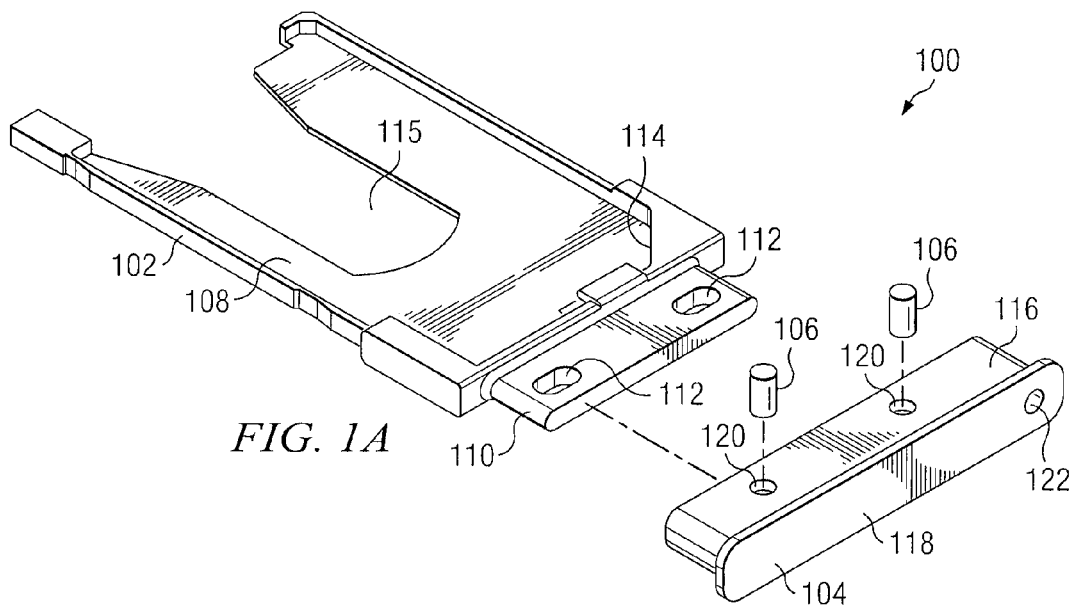
FIG. 1A illustrates an exploded view of selected components of a removable card carrier, in accordance with embodiments of the present disclosure.
Figure 1B:
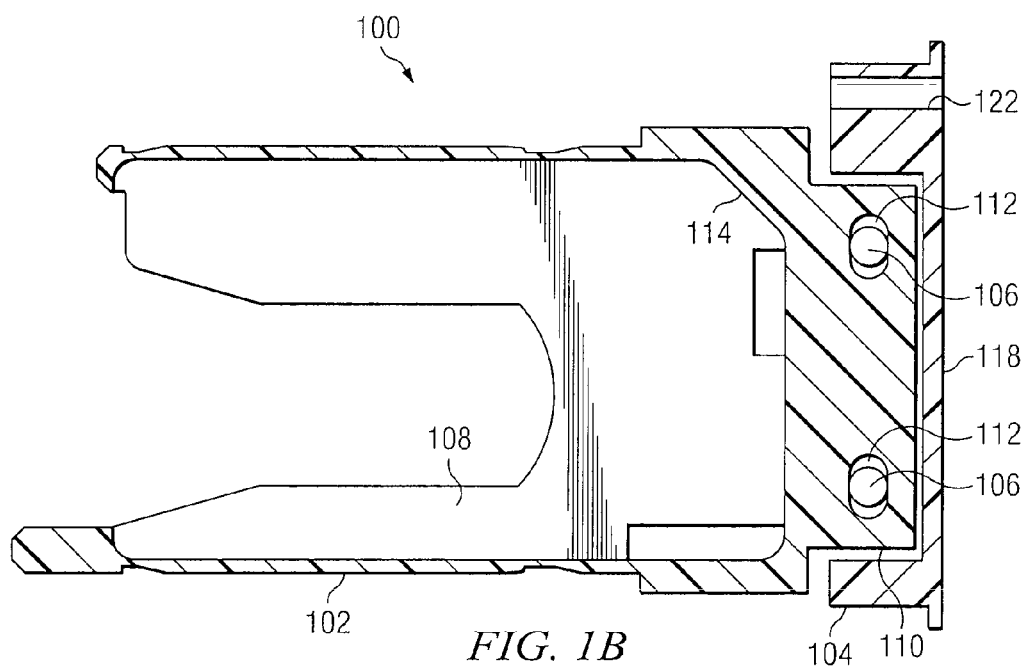
FIG. 1B illustrates a plan view of selected components of a removable card carrier, in accordance with embodiments of the present disclosure.
Figure 1C:
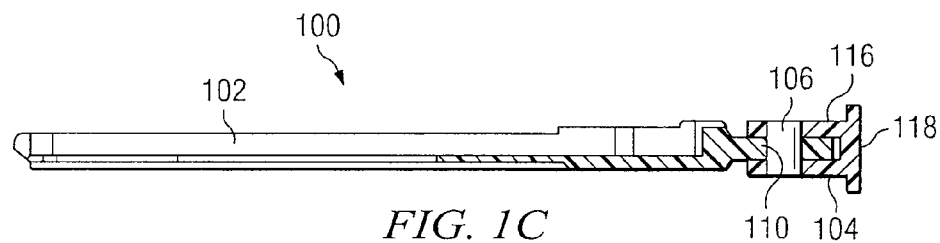
FIG. 1C illustrates a cross-sectional side view of selected components of a removable card carrier, in accordance with embodiments of the present disclosure.

FIGS. 1A-1C illustrate various views of selected components of a removable card carrier 100, in accordance with embodiments of the present disclosure. FIG. 1A illustrates an exploded view, FIG. 1B illustrates a plan view, and FIG. 1C illustrates a cross-sectional side view.

Figure 2:
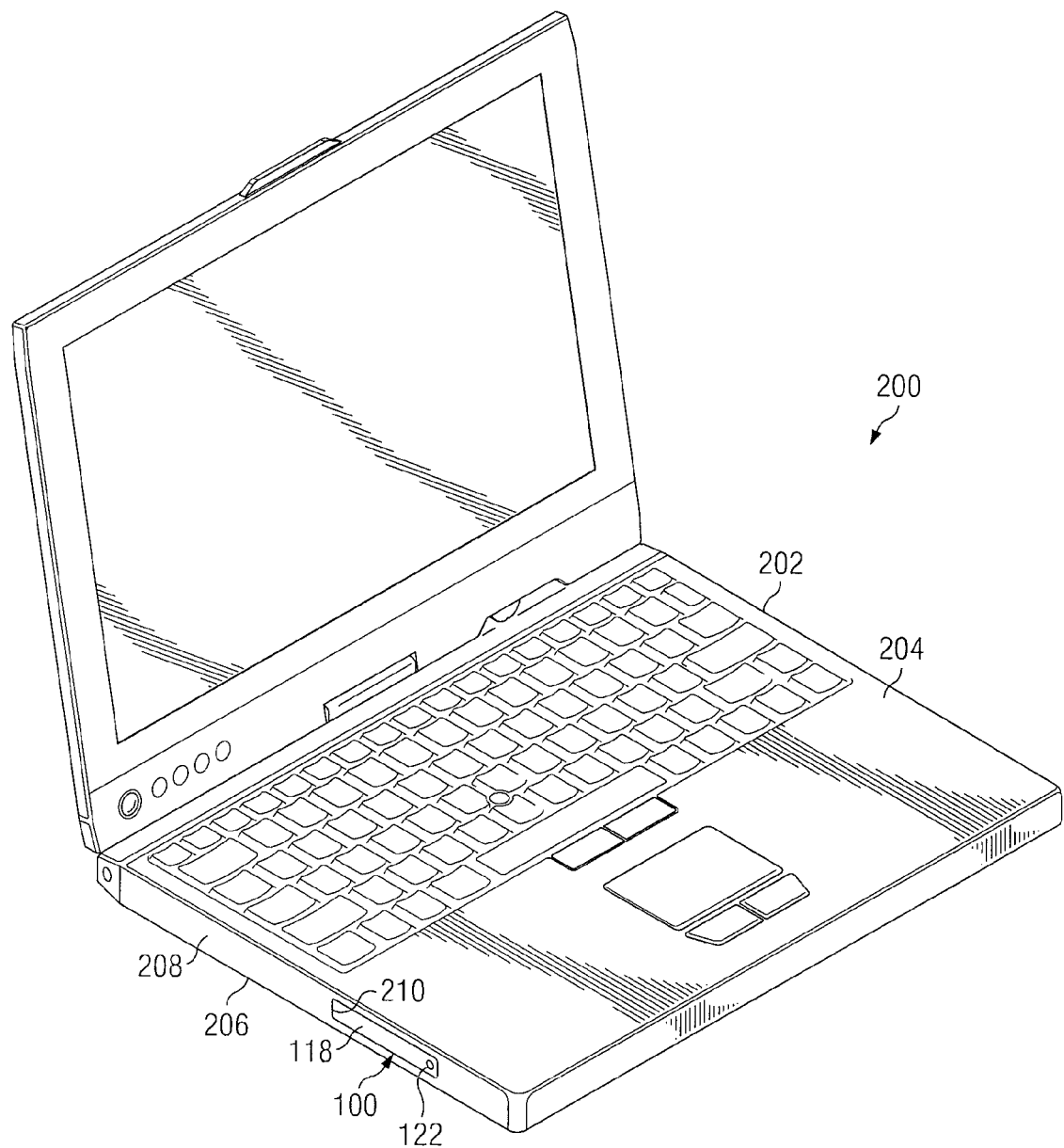
FIG. 2 illustrates an isometric view of the exterior of an information handling system with a card carrier in a closed position, in accordance with embodiments of the present disclosure.

As shown in FIGS. 1A-1C, card carrier 100 may include a body 102 and a cover 104 movably coupled to body 102 via one or more bearings 106. As depicted in FIGS. 1-3, body 102 may include tray 108 and tongue 110. Tray 108 may be any suitable device or apparatus configured to hold a card that may electrically and/or communicatively interface with an information handling system. In certain embodiments, tray 108 may include one or more features that adapt tray 102 to receive a certain type or types of cards. For example, as shown in FIG. 1A, tray 108 may include feature 114 and feature 115 that adapt tray 108 to receive a Subscriber Identity Module (SIM) card. Typically, SIM cards are rectangular in shape except for a slanted corner. Thus, feature 114 as depicted in FIG. 1A may be adapted to fit and/or receive such slanted corner. Furthermore, a SIM card typically includes a plurality of electrical contacts on one of its faces. Thus, feature 115 as depicted in FIG. 1A may be adapted to allow an opening in tray 102 to permit such electrical contacts to interface with corresponding electrical contacts of a SIM card interface.

Although the specific example of tray 108 depicted in FIGS. 1A-1C is adapted to receive a SIM card, tray 102 may be suitably adapted to receive any other type of card that may electrically and/or communicatively interface with an information handling system.

Tongue 110 may be fixedly coupled to tray 108 and may include any suitable extension or projection from tray 108. As shown in FIGS. 1A-1C, tongue 110 may include one or more body openings 112. As described in greater detail below, each body opening 112 may be configured to receive a bearing 106 to movably couple cover 104 to body 102.

Body 102 and one or more of its components may be made of any suitable material and may be made in any suitable manner. In certain embodiments, body 102 may include plastic. In the same or alternative embodiments, body 102 may be made in whole or part using injection molding.

As shown in FIGS. 1A-1C, cover 104 may include a sleeve 116 and a face 118. Sleeve 116 may be of any suitable shape that allows tongue 110 to mate with sleeve 116, such as the elliptical cylindrical shape depicted in FIG. 1A, for example. In certain embodiments, sleeve 116 may be substantially hollow. Sleeve 116 may include one or more cover openings 120, each cover opening 120 configured to receive a bearing 106 to movably couple sleeve 116 to tongue 110, thus movably coupling cover 104 to body 102. In the embodiment depicted in FIGS. 1A-1C, each cover opening 120 on sleeve 116 may have a corresponding opposing cover opening 120 on sleeve 116 such that a bearing may pass substantially entirely through sleeve 116. In such embodiments, bearing 106 may pass through a first cover opening 120 on sleeve 116, a body opening 112 on tongue 110, and a second cover opening 120 on sleeve 116 opposite of first cover opening 120.

As depicted in FIGS. 1A-1C, cover openings 120 may be shaped (e.g., be of a certain size and/or shape) such that bearings 106 are substantially fixed relative to cover openings 120. In addition, body openings 112 may be shaped (e.g., be of a certain size and/or shape) such that bearings 106 are movable about body openings 112. In other embodiments, body openings 112 may be shaped (e.g., be of a certain size and/or shape) such that bearings 106 are substantially fixed relative to body openings 112 and cover openings 120 may be shaped (e.g., be of a certain size and/or shape) such that bearings 106 are movable about cover openings 120. In accordance with either of these embodiments, cover 104 may "float" relative to body 102 about bearings 106.

Face 118 may be fixedly coupled to sleeve 116 and may effectively close sleeve 116 on one of its ends. As shown in FIGS. 1A-1C, the area of the surface of face 118 may be larger than the cross-sectional area of sleeve 116. Face 118 may include an ejection access opening 122, that may allow a user to access an actuator for ejecting card carrier 100 from an information handling system, as described in greater detail below. Although FIGS. 1A-1C depict face 118 as substantially planar, face 118 may be of any suitable shape (e.g., face 118 may be rounded, beveled, etc.).

Cover 104 and one or more of its components may be made of any suitable material and may be made in any suitable manner. In certain embodiments, cover 104 may include aluminum. In the same or alternative embodiments, cover 104 may be machined in whole or part using a milling machine or computer numerical control (CNC) machine.

As discussed above, each bearing 106 may be configured to movably couple sleeve 116 to tongue 110, thus movably coupling cover 104 to body 102. Each bearing 106 may be made from any suitable material (e.g., steel, aluminum, etc.).

FIG. 2 illustrates an isometric view of the exterior of an information handling system 200 with card carrier 100 in a closed position, in accordance with embodiments of the present disclosure. As shown in FIG. 2, information handling system 100 is depicted as a portable computer (e.g., a "laptop" or "notebook" computer). However, in other embodiments, information handling system 100 may be a non-portable computer (e.g., a desktop computer and/or a server) or any other suitable mobile information handling system (e.g., a mobile phone, a personal digital assistant, a portable media player, etc.).

As depicted in FIG. 2, information handling system 200 may include an enclosure 202 (e.g., a case or housing). Enclosure 202 and one or more of its components may be made of one or more suitable materials, including plastic and/or aluminum, for example, and may generally be configured to house various components of information handling system 200 (e.g., electrical components, communicative components, mechanical components, etc.). As shown in FIG. 2, enclosure 202 may include a generally planar top 204, a generally planar bottom 206 offset from and generally parallel to top 204, and four sides 208 non-parallel to bottom 206. Although certain components of enclosure 202 are shown in FIG. 2 as being generally parallel, the various components may be of any suitable shape and/or may include non-parallel features (e.g., rounded features, bezels, etc.).

Enclosure 202 may also include a card interface slot 210 configured to receive a card and card carrier 100. In certain embodiments, card interface slot 210 may be similar in size and/or shape to face 118 such that the exterior surfaces of face 118 and a side 208 are substantially flush with each other when card carrier 100 is disposed in information handling system 200. In the same or alternative embodiments, face 118 may be made of the same material and/or have the same finish as side 208, thus providing a "clean" aesthetic appearance.

Figure 3A:
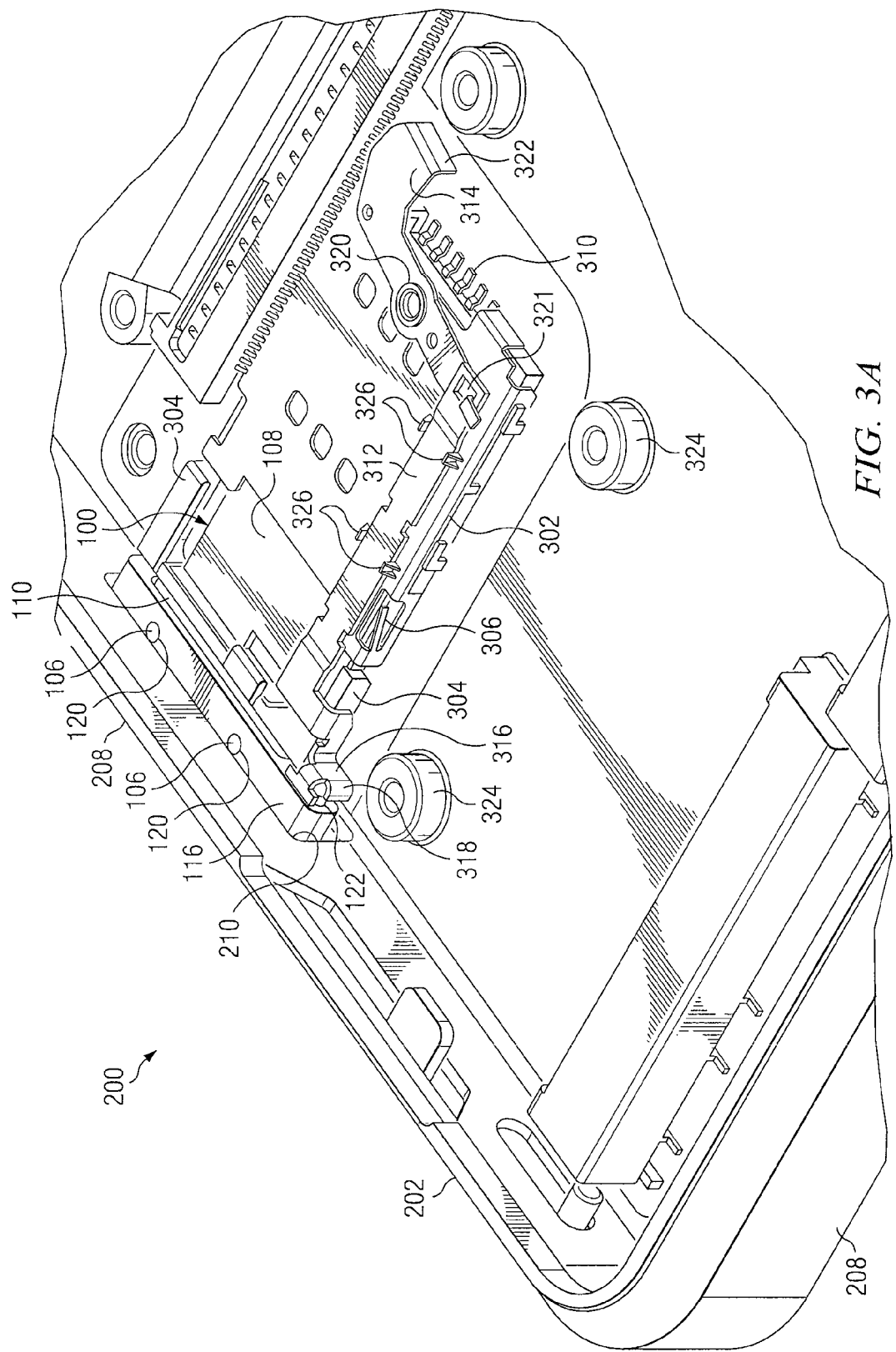
FIG. 3A illustrates a cut-away isometric view of selected components of an information handling system, in accordance with embodiments of the present disclosure.
Figure 3B:
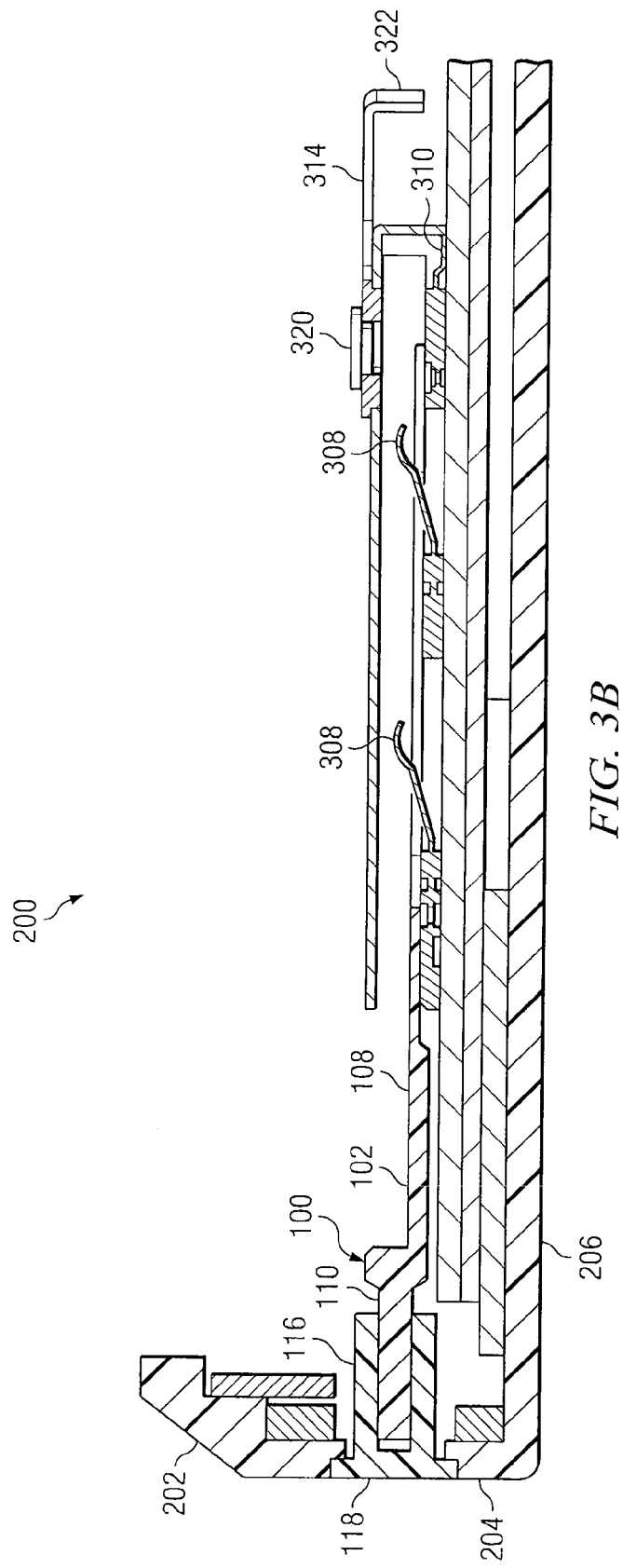
FIG. 3B illustrates a cross-sectional view of selected components of an information handling system, in accordance with embodiments of the present disclosure.

FIGS. 3A-3B illustrate various views of selected components of information handling system 200, in accordance with embodiments of the present disclosure. FIG. 3A illustrates a cut-away isometric view (e.g., with top 204 removed for exposition) and FIG. 3B illustrates a cross-sectional view. As shown in FIGS. 3A-3B, information handling system 200 may further include a card interface assembly 302, a card ejection assembly (including movable member 312 and rotatable member 314) and mounts 324.

Card interface assembly 302 may be any suitable system, device, or apparatus operable to receive a card and/or card carrier 100 and communicatively couple a card to one or more other components of information handling system 200. As depicted in FIGS. 3A-3B, card interface assembly 302 may include card guides 304, card retention members 306, card interface contacts 308, and assembly interface pins 310. Card guides 304 may include any system, device or apparatus configured to guide card carrier 100 into card interface assembly 302. For example, as card carrier 100 is slid into card interface slot 210, one or more card guides 304 may interact with card carrier 100 (e.g., sides of body 102) to guide card carrier 100 and/or a card into a particular orientation within card interface assembly 302 (e.g., orienting card carrier 100 such that electrical contacts of a card carried in card carrier 100 may come in contact with card interface contacts 308).

Card retention members 306 may include any system, device, or apparatus configured to apply a force to card carrier 100 that tends to hold card carrier 100 in place within card interface assembly 302. For example, as shown in FIG. 3A, a card retention member 306 may include a projection that applies force to the side of body 102, thus preventing card carrier 100 from falling out of card interface slot 210.

Card interface contacts 308 may include any generally conductive material that may electrically couple electrical contacts of a card carried in card carrier 100 to assembly interface pins 310. Assembly interface pins 310 may include any generally conductive material that may electrically couple card interface contacts 308 to one or more other components of information handling system 200 such that a card carried in card carrier 100 may be communicatively coupled to one or more components of information handling system 200 (e.g., a processor).

Information handling system 200 may also include a card ejection assembly configured to eject card carrier 100 from card interface slot 210 (e.g., in response to a user action actuating the card ejection assembly). As shown in FIG. 3A card assembly ejection assembly may include a movable member 312 and a rotatable member 314. Movable member 312 may include an actuator 316 and one or more features 318. Actuator 316 may include a flange, projection and/or other suitable structural member that may allow a person or machine to slide or move movable member 312 relative to card interface assembly 302 by applying a mechanical force to actuator 316. In certain embodiments, such mechanical force may be applied using a tool (e.g., an unwound paperclip) inserted through ejection access opening 122. Once actuated, movable member 312 may move in a generally linear direction, guided by ejection assembly guides 326 of card interface assembly 302.

Movable member 312 may also include one or more features (e.g., features 318) shaped, sized or otherwise configured to prevent a tool used to apply mechanical force to actuator 316 from entering other portions of information handling system 200.

Rotatable member 314 may be pivotally coupled to card interface assembly 302 via pivot 320, and pivotally coupled to movable member 312 via pivot 321. When movable member 312 is actuated, movable member 312 may cause rotatable member 314 to rotate about pivot 320. Such rotation may cause rotatable member 314 to fully or partially eject card carrier 100 from card interface slot 210 (e.g., feature 322 of rotatable member may apply a mechanical force to card carrier 100 to cause it to eject from card interface slot 210, or may actuate a spring that causes card carrier 100 to eject from card interface slot 210).

Although the card ejection assembly as depicted above includes particular components (e.g., movable member 312 and rotatable member 314) any suitable method, system or apparatus may be used to eject card carrier 100 from card interface slot 210. For example, in certain embodiments, a user or machine may actuate the release of spring or similar device by applying a force to an actuator via ejection access opening 122. In the same or alternative embodiments, a user or software program may issue a command to information handling system 200 to eject card carrier 100, and such command may be communicated to card interface assembly 302, which may then activate a mechanism to eject card carrier 100 from card interface slot 210.

Figure 4:
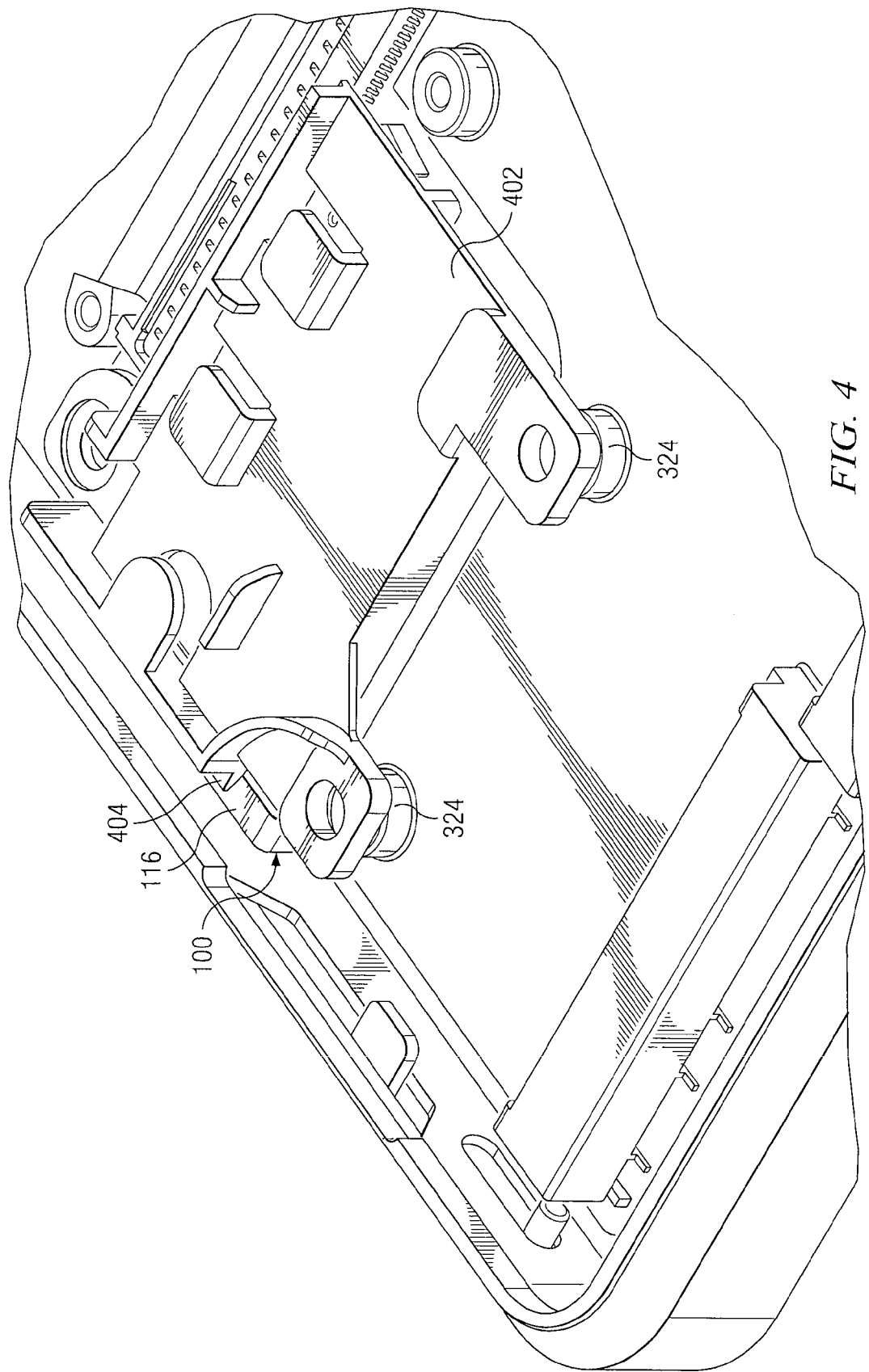
FIG. 4 illustrates a cut-away isometric view of selected components of an information handling system, in accordance with embodiments of the present disclosure.

Mounts 324 may configured to couple other components to information handling system 200. For example, as depicted in FIG. 4, mounts 324 may be used to couple a shield 402 to information handling system 200 over card interface assembly 302. Shield 402 may shield other components of information handling system 200 (e.g., internal cables) from card interface assembly 302 and the card ejection assembly (e.g., to prevent such other components from interfering with moving parts within card interface assembly 302 and the card ejection assembly). Shield 402 may also be configured with features (e.g., feature 404) configured to guide card carrier 100 into card interface assembly 302, similar to card guides 304 discussed above.

Using the methods and systems disclosed herein, problems associated with conventional approaches to providing an aesthetically-pleasing, user-accessible card slot may be reduced or eliminated. For example, methods and systems disclosed herein provide a card carrier (e.g., card carrier 100) wherein a cosmetic cover (e.g., cover 104) of the card carrier may be movable or "float" with respect to a body (e.g., body 102) of the card carrier. Because of this float, the cosmetic cover may fit into a card interface slot (e.g., card interface slot 210) such that the cosmetic cover is substantially flush with the exterior of an information handling system (e.g., the external surface of side 208), while reducing or eliminating the presence of mechanical misalignment stress between the card carrier and a card interface assembly (e.g., card interface assembly 302) relative to traditional approaches, as well as reducing or eliminating the presence of misalignment between electrical contacts of card carried in the card carrier and electrical contacts of the card interface assembly.

Although the present disclosure has been described in detail, it should be understood that various changes, substitutions, and alterations can be made hereto without departing from the spirit and the scope of the disclosure as defined by the appended claims.

What is claimed is:

1. A removable card carrier configured to mechanically interface an information handling system comprising:
   the body adapted to hold a card; and
   the cover movably coupled to the body such that exterior surfaces of the cover and the information handling system are substantially flush with each other when the card carrier is disposed in the information handling system.

2. A removable card carrier according to claim 1, wherein the body is adapted to hold a Subscriber Identity Module (SIM) card.

3. A removable card carrier according to claim 1, further comprising the body movably coupled to the cover via at least one bearing.

4. A removable card carrier according to claim 3, further comprising:
   the cover including a sleeve having at least one cover opening; and
   the body including at least one body opening;
   wherein each of the at least one cover opening and the at least one body opening are configured to receive the at least one bearing to movably couple the cover to the body.

5. A removable card carrier according to claim 4, the sleeve further having at least one opposing cover opening opposite to the at least one opening, the at least one opposing cover opening configured to receive the at least one bearing to movably couple the cover to the body.

6. A removable card carrier according to claim 5, further comprising:
   the at least one cover opening and the at least one opposing cover opening shaped such that the at least one bearing is substantially fixed relative to the cover; and
   the at least one body opening shaped such that the at least one bearing is movable about the at least one body opening.

7. A removable card carrier according to claim 5, further comprising:
   the at least one body opening shaped such that the at least one bearing is substantially fixed relative to the body; and
   the at least one cover opening and the at least one opposing cover opening shaped such that the at least one bearing is movable about the at least one cover opening and the at least one opposing cover opening.

8. A removable card carrier according to claim 1, further comprising the card carrier including an ejection access opening through which a tool is inserted to actuate a card ejection assembly operable to eject the card carrier from the information handling system.

9. An information handling system, comprising:
   a card interface assembly configured to receive a card; and
   a removable card carrier configured to mechanically interface the card with the card interface assembly, the removable card carrier comprising:
      a body adapted to hold the card; and
      a cover movably coupled to the body such that exterior surfaces of the cover and the information handling system are substantially flush with each other when card carrier is disposed in the card interface assembly.

10. An information handling system according to claim 9, wherein the body is adapted to hold a Subscriber Identity Module (SIM) card.

11. An information handling system according to claim 9, further comprising the body movably coupled to the cover via at least one bearing.

12. An information handling system according to claim 11, further comprising:
   the cover including a sleeve having at least one cover opening; and
   the body including at least one body opening;
   wherein each of the at least one cover opening and the at least one body opening are configured to receive the at least one bearing to movably couple the cover to the body.

13. An information handling system according to claim 12, the sleeve further having at least one opposing cover opening opposite to the at least one opening, the at least one opposing cover opening configured to receive the at least one bearing to movably couple the cover to the body.

14. An information handling system according to claim 13, further comprising:
   the at least one cover opening and the at least one opposing cover opening shaped such that the at least one bearing is substantially fixed relative to the cover; and
   the at least one body opening shaped such that the at least one bearing is movable about the at least one body opening.

15. An information handling system according to claim 13, further comprising:
   the at least one body opening shaped such that the at least one bearing is substantially fixed relative to the body; and
   the at least one cover opening and the at least one opposing cover opening shaped such that the at least one bearing is movable about the at least one cover opening and the at least one opposing cover opening.

16. An information handling system according to claim 15, further comprising a card ejection assembly configured to eject the card carrier from the card interface assembly.

17. An information handling system according to claim 16, further comprising the card carrier including an ejection access opening through which a tool is inserted to actuate cause the card ejection assembly operable to eject the card carrier from the card interface assembly.

18. An information handling system according to claim 17, further comprising:
   a movable member having an actuator, the actuator configured to induce movement of the movable member relative to the card interface assembly when a mechanical force is applied to the actuator; and a rotatable member pivotally coupled to the movable member and configured to rotate about a pivot in response to movement of the movable member, wherein such rotation causes ejection of the card carrier from the card interface assembly.

19. An information handling system according to claim 18, further comprising the card interface assembly having at least one guide configured to linearly guide movement of the movable member.

20. An information handling system according to claim 18, further comprising the rotatable member pivotally coupled to the card interface assembly via the pivot.

* * * * *